(12) United States Patent
Lazzaro et al.

(10) Patent No.: US 6,456,432 B1
(45) Date of Patent: Sep. 24, 2002

(54) STEREOSCOPIC 3-D VIEWING SYSTEM WITH PORTABLE ELECTRO-OPTICAL VIEWING GLASSES AND SHUTTER-STATE CONTROL SIGNAL TRANSMITTER HAVING MULTIPLE MODES OF OPERATION FOR STEREOSCOPIC VIEWING OF 3-D IMAGES DISPLAYED IN DIFFERENT STEREOSCOPIC IMAGE FORMATS

(75) Inventors: Gerard M. Lazzaro, New Milford, CT (US); David C. Swift, Ossining, NY (US); Gregory J. Hamlin, Presque Isle, ME (US); Sadeg M. Faris, Pleasantville, NY (US)

(73) Assignee: Reveo, Inc., Elmsford, NY (US)

( * ) Notice: Subject to any disclaimer, the term of this patent is extended or adjusted under 35 U.S.C. 154(b) by 0 days.

(21) Appl. No.: 09/164,050

(22) Filed: Sep. 30, 1998

Related U.S. Application Data

(63) Continuation of application No. 08/648,215, filed on May 15, 1996, now Pat. No. 5,821,989, which is a continuation-in-part of application No. 08/614,569, filed on Mar. 13, 1996, now abandoned, and a continuation-in-part of application No. 08/563,520, filed on Nov. 28, 1995, now Pat. No. 5,680,233, and a continuation-in-part of application No. 08/527,094, filed on Sep. 12, 1995, now Pat. No. 5,844,717, and a continuation-in-part of application No. 08/339,986, filed on Nov. 14, 1994, now Pat. No. 5,502,481, and a continuation-in-part of application No. 08/322,219, filed on Nov. 13, 1994, now Pat. No. 5,801,793, and a continuation-in-part of application No. 08/230,779, filed on Apr. 21, 1994, now Pat. No. 5,828,427, and a continuation-in-part of application No. 08/126,077, filed on Sep. 23, 1993, now Pat. No. 5,537,144, and a continuation-in-part of application No. 07/976,518, filed on Nov. 16, 1992, now Pat. No. 5,553,203, which is a continuation of application No. 07/587,664, filed on Sep. 26, 1990, now Pat. No. 5,165,013, said application No. 08/527,094, is a continuation of application No. 08/269,202, filed on Jun. 30, 1994, now abandoned, which is a continuation of application No. 07/536,419, filed on Jun. 11, 1990, now Pat. No. 5,327,285, said application No. 08/126,077, is a continuation of application No. 07/536,190, filed on Jun. 11, 1990, now abandoned.

(51) Int. Cl.[7] .................. G02B 27/26; G02F 1/1335; H04N 15/00; H04N 13/04; H04N 9/47
(52) U.S. Cl. ............... 359/464; 359/465; 349/15; 348/43; 348/53; 348/56; 348/58
(58) Field of Search .................. 359/464, 465; 349/15; 348/53, 55, 56, 57, 58, 43

(56) References Cited

U.S. PATENT DOCUMENTS

| | | | | |
|---|---|---|---|---|
| 3,737,567 A | * | 6/1973 | Kratomi | 359/464 |
| 3,903,358 A | * | 9/1975 | Roese | 359/465 |
| 4,424,529 A | * | 1/1984 | Roese et al. | 348/56 |
| 4,630,097 A | * | 12/1986 | Marks | 348/58 |
| 4,672,434 A | * | 6/1987 | Suzuki et al. | 348/56 |
| 4,736,246 A | * | 4/1988 | Nishikawa | 348/56 |
| 4,772,944 A | * | 9/1988 | Yoshimura | 348/56 |
| 4,907,860 A | * | 3/1990 | Noble | 348/56 |
| 4,967,268 A | * | 10/1990 | Lipton et al. | 348/56 |
| 5,193,000 A | * | 3/1993 | Lipton et al. | 348/43 |
| 5,523,886 A | * | 6/1996 | Johnson-Williams et al. | 359/464 |

* cited by examiner

Primary Examiner—Jon Henry
(74) Attorney, Agent, or Firm—Thomas J. Perkowski; Gerow D. Brill

(57) ABSTRACT

The present invention relates to a system and method of viewing pairs of perspective images of 3-D objects (i.e. stereoscopic image pairs) displayed from a CRT display surface in a time-multiplexed or field-sequential manner, and more particularly to a universal method of generating control signals for synchronously changing the optical state of liquid crystal (LC) shutter panels through which the time-multiplexed perspective. images can be sequentially viewed in a substantially flicker-free manner by the left and right eyes of a human viewer, independent of whether the images are displayed on NTSC, PAL, VGA or SVGA styled CRT display devices.

8 Claims, 12 Drawing Sheets

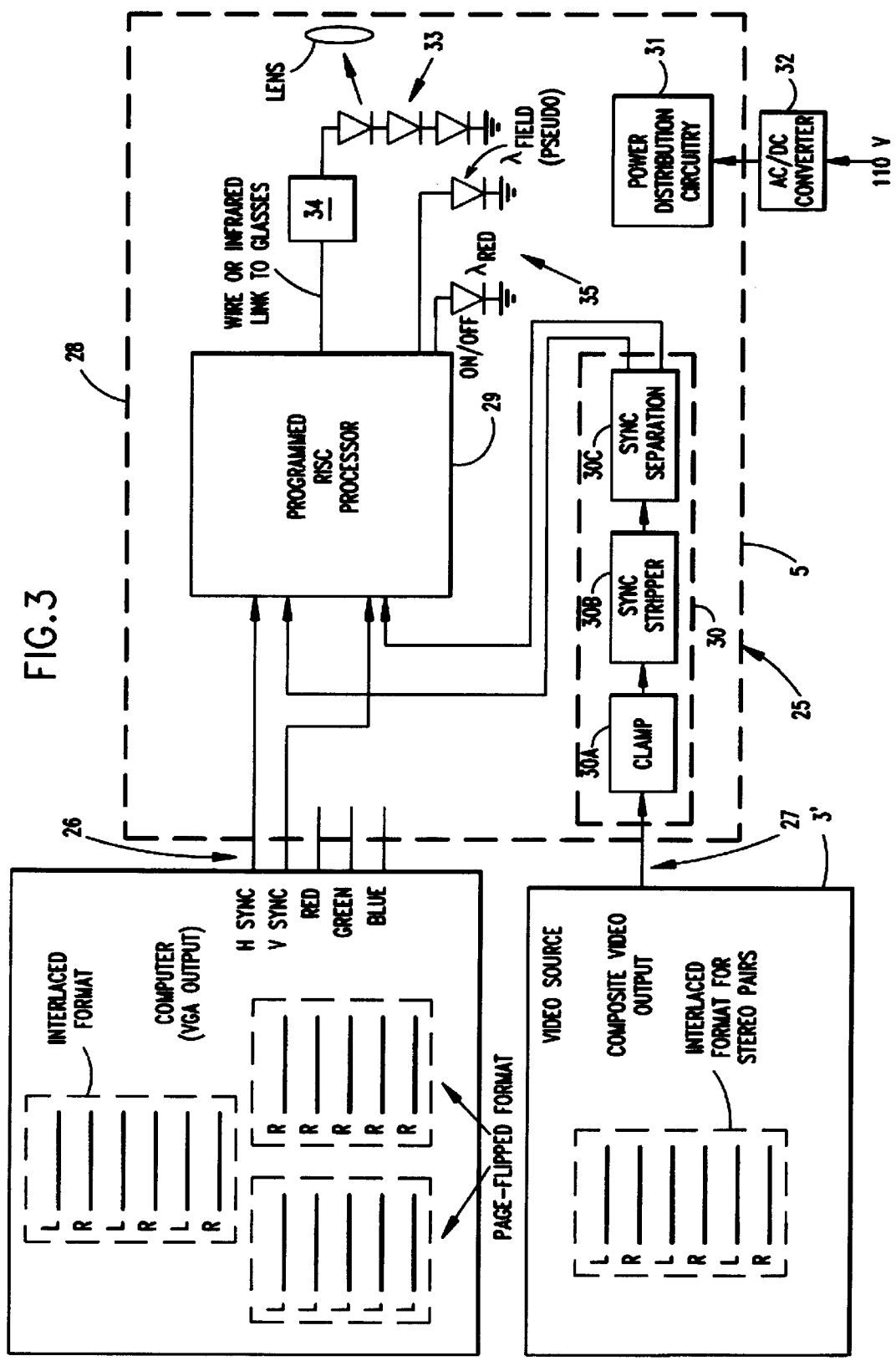

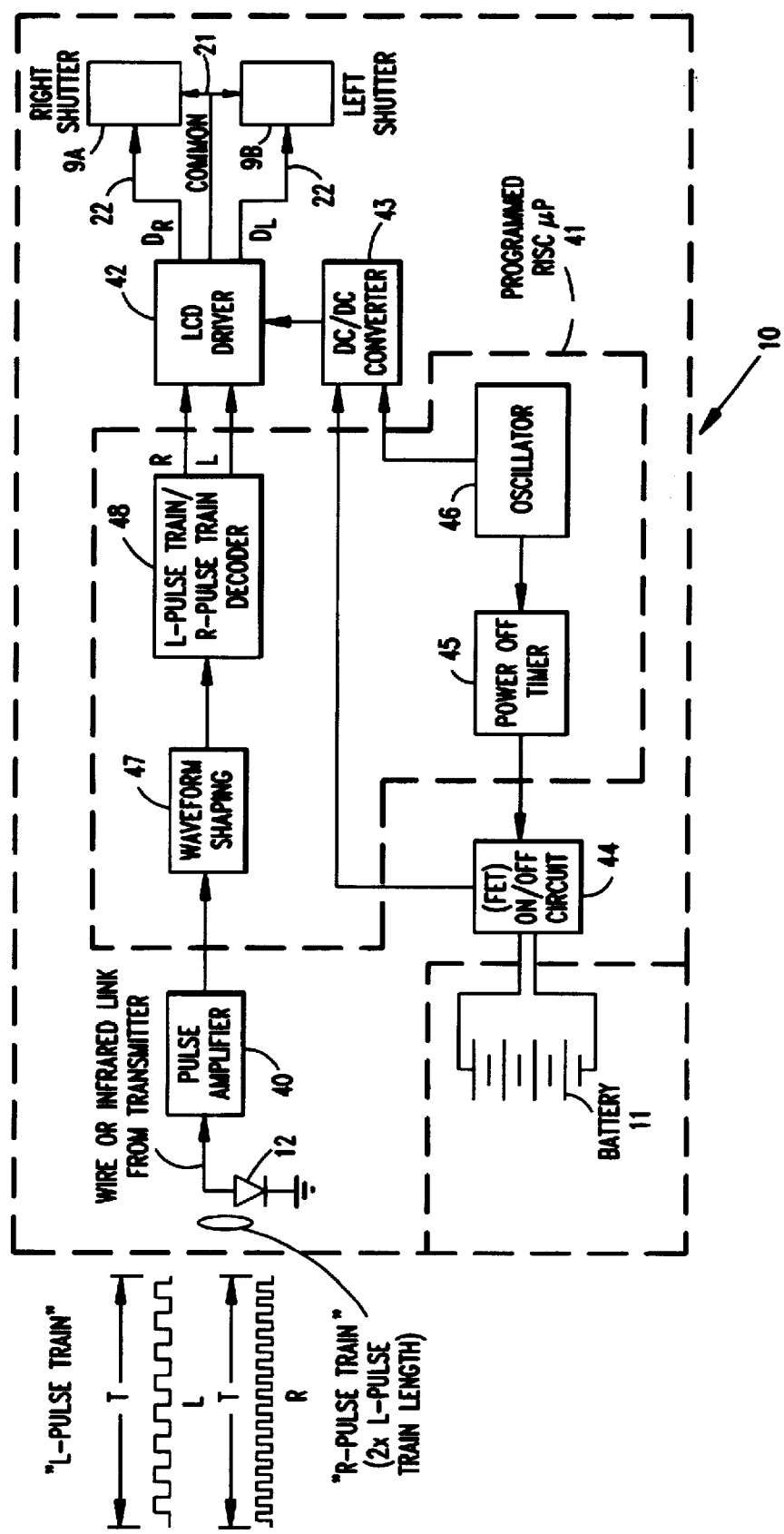

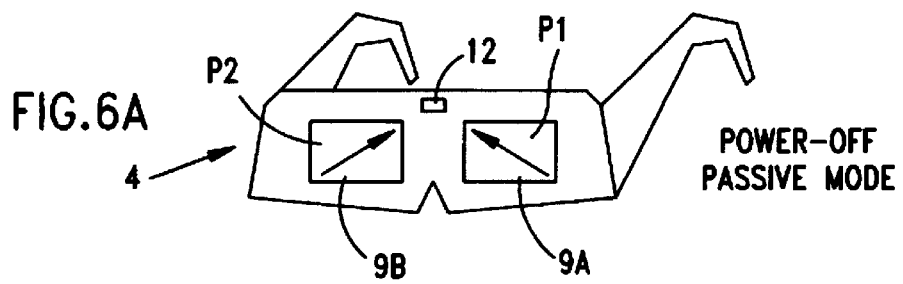
FIG.6A "SMI 3-D VIEWING MODE" POWER-OFF PASSIVE MODE
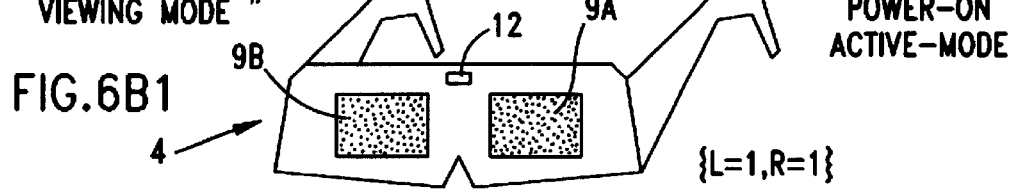
FIG.6B1 "2-D HEAD TO HEAD VIEWING MODE" POWER-ON ACTIVE-MODE {L=1,R=1}
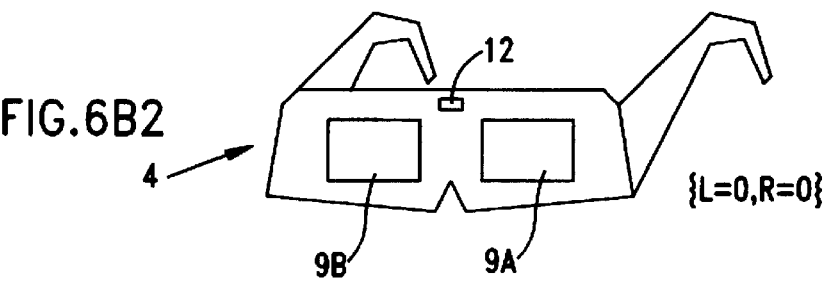
FIG.6B2 {L=0,R=0}
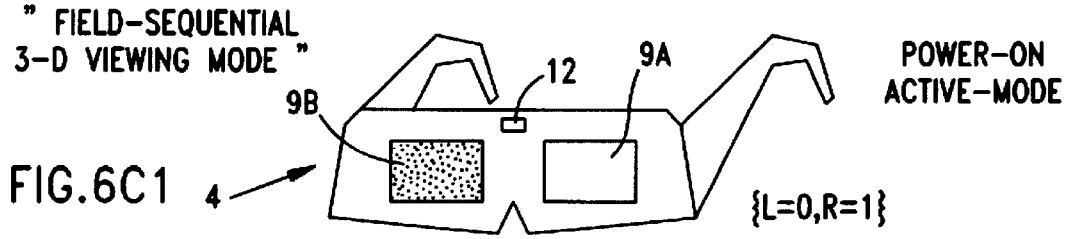
FIG.6C1 "FIELD-SEQUENTIAL 3-D VIEWING MODE" POWER-ON ACTIVE-MODE {L=0,R=1}
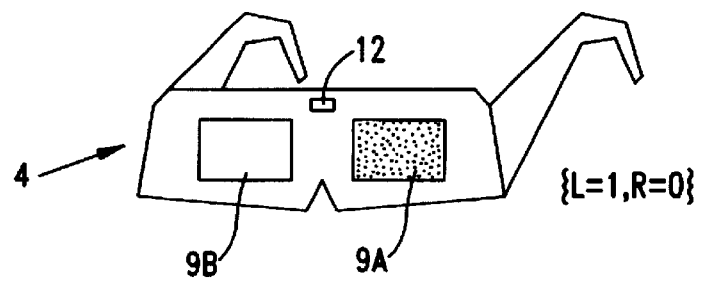
FIG.6C2 {L=1,R=0}

STEREOSCOPIC 3-D VIEWING SYSTEM WITH PORTABLE ELECTRO-OPTICAL VIEWING GLASSES AND SHUTTER-STATE CONTROL SIGNAL TRANSMITTER HAVING MULTIPLE MODES OF OPERATION FOR STEREOSCOPIC VIEWING OF 3-D IMAGES DISPLAYED IN DIFFERENT STEREOSCOPIC IMAGE FORMATS

RELATED CASES

This Application is a Continuation of application Ser. No. 08/648,215 entitled "STEREOSCOPIC 3-D VIEWING SYSTEM WITH PORTABLE ELECTRO-OPTICAL VIEWING GLASSES AND SHUTTER-STATE CONTROL SIGNAL TRANSMITTER HAVING MULTIPLE MODES OF OPERATION FOR STEREOSCOPIC VIEWING OF 3-D IMAGES DISPLAYED IN DIFFERENT STEREOSCOPIC IMAGE FORMATS" filed May 15, 1996, now U.S. Pat. No. 5,821,989 which is a Continuation-in-Part of: Copending application Ser. No. 08/614,569 entitled "SYSTEM AND METHOD FOR STEREOSCOPIC VIEWING 3-D OBJECTS USING PHASE-RETARDING MICROPOLARZATION PANELS AND PHASE-RETARDATION ERROR CORRECTING VIEWING DEVICES" filed Mar. 13, 1995, now abandoned, copending application Ser. No. 08/563,520 entitled "IMAGE DISPLAY SYSTEMS HAVING DIRECT AND PROJECTION VIEWING MODES" filed Nov. 28, 1995 now U.S. Pat. No. 5,680,233; copending application Ser. No. 08/339,986 entitled "DESKTOP-BASED PROJECTION DISPLAY SYSTEM FOR STEREOSCOPIC VIEWING OF DISPLAYED IMAGERY OVER A WIDE FIELD OF VIEW (as amended)" filed Nov. 14, 1994 now U.S. Pat. No. 5,502,481; copending application Ser. Nos. 08/322,219 entitled "BACKLIGHTING CONSTRUCTION FOR USE IN COMPUTER-BASED DISPLAY SYSTEM HAVING DIRECT AND PROJECTION VIEWING MODES "OF OPERATION" filed Oct. 13, 1994, now U.S. Pat. No. 5,801,793; copending application Ser. No. 08/230,779 entitled "ELECTRO-OPTICAL BACKLIGHTING PANEL FOR USE IN COMPUTER-BASED DISPLAY SYSTEMS AND PORTABLE LIGHT PROJECTION DEVICE FOR USE THEREWITH", filed Apr. 21, 1994 now U.S. Pat. No. 5,828,427; copending application Ser. No. 08/126,077 entitled "METHOD AND APPARATUS FOR RECORDING AND DISPLAYING SPATIALLY-MULTIPLEXED IMAGES OF 3-D OBJECTS, FOR STEREOSCOPIC VIEWING THEREOF" filed Sep. 23, 1993, now U.S. Pat. No. 5,537,144 which is a Continuation of application Ser. No. 07/536,190 filed Jun. 11, 1990, now abandoned; co-pending application Ser. No. 08/527,094 entitled "METHOD AND SYSTEM FOR PRODUCING MICROPOLARZATION MATERIAL PANELS FOR USE IN STEREOSCOPIC VIEWING OF 3-D OBJECTS REPRESENTED IN SPATIALLY MULTIPLEXED IMAGES" filed Sep. 12, 1995 now U.S. Pat. No. 5,844,717, which is a Continuation of application Ser. No. 081269,202 filed Jun. 30, 1994, now abandoned, which is Continuation of application Ser. No. 07/536,419 filed on Jun. 11, 1990, now U.S. Pat. No. 5,3.27,285; and co-pending application Ser. No. 07/976,518 entitled "METHOD AND APPARATUS FOR PRODUCING AND RECORDING SPATIALLY-MULTIPLEXED IMAGES FOR USE IN 3-D STEREOSCOPIC VIEWING THEREOF" filed Nov. 16, 1992, now U.S. Pat. No. 5,553,203 which is a Continuation of application Ser. No. 07/587,664 filed Sep. 26, 1990 now U.S. Pat. No. 5,165,013. These co-pending Applications are commonly owned by Reveo, Inc. of Hawthorne, N.Y., and each such Application is hereby incorporated herein by reference in its entirety, as if fully set forth herein.

BACKGROUND OF THE INVENTION

1. Field of the Invention

The present invention relates to a system and method of viewing pairs of perspective images of 3-D objects (i.e. stereoscopic image pairs) displayed from a CRT display surface in a time-multiplexed or field-sequential manner, and more particularly to a universal method of generating control signals for synchronously changing the optical state of liquid crystal (LC) shutter panels through which the time-multiplexed perspective images can be sequentially viewed in a substantially flicker-free manner by the left and right eyes of a human viewer, independent of whether the images are displayed on NTSC, PAL, VGA or SVGA styled CRT display devices.

2. Brief Description of the Prior Art

During the course of human history, man has developed numerous ways of displaying two-dimensional (2-D) images of real and synthetic images alike. In many ways, the evolution of image display technology can be linked to particular stages of development in human civilization.

In the contempory period, diverse types of image display devices have been developed for displaying 2-D images. Examples of such technologies include: cathode ray tube (CRT) display monitors; liquid crystal display panels; plasma display panels; active-matrix plasma display panels; and the like. Presently, the CRT display device (i.e. CRT tube) is widely used in most video monitors of personal computer (PC) systems, as well as in most commercially produced television sets. The principal difference between a CRT computer video monitor and a CRT television display tube is the rate at which image frames or lines are Us are displayed, and the composition of the video signals which each such display device is designed to receive and process during the image display process. In conventional CRT-based television sets, which are constructed and operate according to NTSC or PAL design criteria, the horizontal and vertical synchronization (retrace) signals are multiplexed with the RGB (i.e. color) signals to produce a single composite video signal that is transmitted over a signal conductor, reference to electrical ground. In conventional CRT-based computer display monitors, which are constructed and operated according to VGA or SVGA design criteria, the horizontal synchronization (retrace) signal, the vertical synchronization (retrace) signal, and the RGB (i.e. color) signals are each transmitted over a separate signal conductor, referenced to electrical ground, necessitating a six (6) pin electrical connector for VGA and SVGA styled video monitors. Inasmuch as these design standards create different electrical interface requirements for such types of CRT display devices, NTSC and PAL video display devices can only be driven by NTSC and PAL video signals, respectively, whereas VGA and SVGA styled video display monitor devices can only be driven by VGA and SVGA video signals, respectively. From a practical point of view, VGA or SVGA video signals generated from a graphics accelerator/video board within a computer graphics workstation cannot be used to produce video graphics on a CRT-based television set without the use of special signal conversion equipment. Similarly, composite NTSC or PAL video signals generated from VCR player cannot be used to produce video graphics on a CRT-based computer video monitor without the use of such special signal conversion equipment.

CRT-based display, devices (i.e. computer monitors) designed to be driven by VGA or SVGA video signals typically have an interlace mode and a non-interlace mode (page-flip mode), while CRT-based display devices (I.e. Television sets) designed to be driven by composite NTSC or PAL video signals have only an interlace mode. By virtue of the interlace mode, it is possible for all of the even lines of a video frame to be displayed on the surface of the CRT tube during the first portion of a display period, while all of the odd lines of a video frame are displayed on the surface of the CRT tube during the second portion of a display period, effectively doubling the image display rate at perceived by the eye of the viewer, and thereby reducing image flicker.

Today there is a movement to display stereoscopic image pairs displayed on CRT display devices in order support stereoscopic 3-D vision with full 3-D depth sensation in diverse environments.

While there exist several different techniques for achieving stereoscopic 3-D viewing, the "field-sequential" or "time-multiplexing" technique enjoys great popularity as it can be easily carried out using a pair of LCD shutter glasses. The function of the LCD shutter glasses is sequentially present to the left eye of a viewer, the left image (of a stereo pair) displayed on a CRT display screen during left image display period, and thereafter, present the right image of the viewer the right image of the stereo pair displayed during right image display period. Over the left and right display periods, the perceived left and right images fuse to provide stereopsis in the mind of the viewer.

The function of the LCD shutters is to sequentially undergo a change in optical state during the left and right image display periods, to allow the viewer stereoscopically view sequentially displayed stereoscopic pairs. This function is carried out by electrically switching the optical state of the LCD shutters in response to trigger signals produced from the video signals. In particular, at the beginning of the left image display period, the optical state of the left eye LCD shutter is synchronously switched from its opaque state to its transparent state and the optical state of the right eye LCD shutter is synchronously switched from its transparent state to its opaque state. Then at the beginning of the right image display period, the optical state of the right eye LCD shutter is synchronously changed from its opaque state to its transparent state and the optical state of the left eye LCD shutter is synchronously changed from its transparent state to its opaque state. Such synchronously switching operations require the generation of trigger (i.e. switching) signals for driving the operations of the LCD shutters.

Presently, a number of LC shutter glasses are commercially available for use with the field-sequential stereoscopic 3-D image display technique. While some LCD shutter glasses are designed for use with CRT display devices driven by VGA video signals (i.e. computer monitors), others are designed for use with CRT display devices driven by composite video sources (e.g. television sets). However, there does not exist a pair of LCD shutter glasses that can be used with either type of CRT display device.

Prior art LC shutter glasses suffer from a number of shortcomings and drawbacks. In particular, many prior art LC shutter glasses attempt to synchronize the shutter transition to the beginning of each video frame. Once a vertical reset pulse or similar signal is detected, pulse coded information is sent to toggle the optical state of the shutters. However, as this information is sent at the beginning of each field of video, it must be of very short duration in order to allow sufficient time for the shutters to change state before the vertical blanking interval ends. This prior art shutter-state control/synchronization technique requires providing high speed circuitry in the LC eyewear (or associated receiving unit) in order to decode these short time-domain shutter control pulses. Moreover, such circuitry utilizes battery power, and thus shortens the effective life of the batteries aboard the electro-optical shutter glasses.

Another shortcoming of prior art shutter glasses is that a background excitation voltage is required to keep the pi-cell shutters in the transmissive state.

Thus there is a great need in the art for an improved stereoscopic viewing system which avoids the shortcomings and drawbacks associated with prior art systems and methodologies.

OBJECTS AND SUMMARY OF THE INVENTION

A primary object of the present invention is to provide a stereoscopic 3-D image viewing system for stereoscopically viewing 3-D images displayed on either a CRT computer or video display device.

Another object of the present invention is to provide such a system, in which lightweight stereoscopic 3-D shutter-type viewing glasses are used to view stereoscopic image pairs displayed on a CRT computer or video display device according the time-multiplexing display technique.

Another object of the present invention is to provide such a system, in which signal decoding and processing is minimized within the stereoscopic 3-D shutter-type viewing glasses in order to reduce the cost of manufacture thereof, while providing extended battery life.

Another object of the present invention is to provide a pair of LCD shutter glasses having a passive mode of operation for use in decoding micropolarized spatially-multiplexed images displayed from an spatially-multiplexed image display system.

Another object of the present invention is to provide such a system, in which a means is provided for detecting stereoscopically encoded video synchronization signals from a computer or other video source and transmitting field information for controlling remote pairs of optical state varying LCD shutters via pulse width modulated infrared. pulses.

Another object of the present invention is to provide such a system, in which one shutter switches to the transmissive state while the other shutter switches to the opaque state synchronized to a specific field of information displayed on the CRT or display device.

Another object of the present invention is to provide a stereoscopic viewing system, which has a display mode that allows two viewers, wearing two separate pairs of LCD glasses of the present invention to view two separate images simultaneously on the same display screen. for example, to play a head-to-head video game on the same viewing screen without interference.

Another object of the present invention is to provide a stereoscopic viewing system, wherein the polarization axis of the LCD shutters glasses can be passively oriented in opposing directions and thus be used as a pair of electrically-passive polarizing glasses to stereoscopically view spatially multiplexed images (SMI).

Another object of the present invention is to provide a stereoscopic viewing system, having several different modes of operation which make it possible for a viewer, in a multi-format stereoscopic environment, to view a variety of stereoscopic images with the same viewing glasses.

Another object of the present invention is to provide a method of generating synchronization signals for use in a stereoscopic viewing system which employs low cost, twisted nematic (TN) liquid crystal (LC) displays as the optical shutters, and control signals adjusted for the slower transition times and inherent process variations associated therewith.

Another object of the present invention is to provide a synchronization signal generation scheme which has the inherent ability to detect interlaced and non-interlaced modes in computer generated or standard video signals, and transmit appropriate shutter control signals via an infrared link to the remote shutter glasses.

Another object of the present invention is to provide such a synchronization signal generation system, in which the synchronization control signals generated therefrom are adjustable for the slower transition times and inherent process variations associated with optical shutters constructed from low-cost twisted nematic (TN) liquid crystal (LC) display panels which do not require any background excitation voltage while in the clear state, and thus longer battery life can be achieved.

Another object of the present invention is to provide a pair of LC optical shutter glasses constructed from low-cost twisted nematic (TN) liquid crystal (LC) display panels which do not require any background excitation voltage while in the clear state, and thus longer battery life can be achieved.

Another object of the present invention is to provide a pair of LC optical shutter glasses, in which the shutter drive circuitry is effectively disposed into a "sleep" mode until a change of optical state is required by the shutter panels, thereby substantially increasing battery life.

Another object of the present invention is to provide a novel shutter-based stereoscopic viewing system, having a synchronization signal transmitter with a multi-synch detection capability for interpreting both interlaced and non-interlaced video conditions, generating synchronization signals and transmitting the same to optical shutters glasses for controlling the optical state of the same.

Another object of the present invention is to provide a universal multi-sync signal detection device that can detect synchronization signals, polarities and frequencies present in all VGA and SVGA video formats, as well as, NTSC and PAL composite video sources; determine the image field rate from these signals; determine the presence or absence of stereoscopically encoded video signals; and transmit the appropriate signals for controlling the optical shutters in the remote viewing glasses.

Another object of the present invention is to provide a shutter glasses with decoding circuitry that detects the presence of pulse width modulated infrared signals, recognize a difference between two adjacent pulses and sets the corresponding optical shutter state.

Another object of the present invention is to provide shutter glasses with decoding circuitry which, when detecting no difference between two adjacent IR pulses, automatically determines that a non-interlaced video condition exists and places both optical shutters in the optically transmissive state indicating a non-stereoscopic video image is to be viewed.

Another object of the present invention is to provide shutter glasses with decoding circuitry which, when detecting alternating pulse widths of two predetermined lengths, automatically determines that an interlace condition exists, and simultaneously alters the optical state of the LCD shutters at the corresponding video field rates for viewing stereoscopic video images.

Another object of the present invention is to provide shutter glasses with decoding circuitry which, when detecting no IR pulses automatically enters a sleep mode or off sleep-state which will place both optical shutters in the optically transmissive state.

Another object of the present invention is to provide shutter glasses which do not require any background excitation voltage to keep the shutters in the optically transmissive state.

Another object of the present invention is to provide such shutter glasses, in which the polarization state of the optical-state varying shutters are oriented orthogonally when operated in their electrically-passive transmissive state, for use in stereoscopically viewing linearly polarized spatial multiplexed images.

Another object of the present invention is to provide a stereoscopic 3-D image viewing system based on the spatially-multiplexed image (SMI) display form, in which the shutter glasses of the present invention are used in their electrically-passive transmissive state, for stereoscopically viewing linearly micropolarized polarized SMIs displayed from an LCD panel.

These and other object of the present invention will become apparent hereinafter.

BRIEF DESCRIPTION OF DRAWINGS

For a complete understanding of the Objects of the Present Invention, the following Detailed Description of the Illustrative Embodiments should be read in conjunction with the accompanying Drawings, wherein:

FIG. 3 is a schematic diagram of the shutter-state control signal transmitter the present invention, wherein its computer input port is provided with an input signal from a VGA/SVGA computer video source (e.g. VGA/SVGA graphics and video accelerator card), and alternatively, its video source input port is provided with an input signal from a NTSC or PAL composite video signal source (e.g. VCR/player);

FIG. 4 is a schematic block diagram of the wireless stereoscopic 3D glasses of the present invention, showing the various electronic and opto-electronic components embedded within the lightweight, headsupportable frame thereof;

FIG. 6A is schematic diagram of the stereoscopic 3-D viewing glasses of the present invention, shown being operated in its electrically passive mode (i.e. battery-power OFF), wherein the left eye viewing shutter is induced into an optically transparent polarization state PI, while the right eye viewing shutter is induced into an optically transparent polarization state P2, orthogonal to P1;

FIG. 6B A schematic diagram of the stereoscopic 3-D viewing glasses of the present invention, showing being operated in its electrically-active mode (i.e. battery-power ON), where during a first 2-D image display period the stereoscopic viewing glasses receive infrared (pulse-train encoded) shutter-state control signals from the shutter-state control signal transmitter so as to drive both left and right eye viewing shutters into an optically opaque state, and then during a second 2-D image display period the stereoscopic viewing glasses receive infrared ("pseudo" pulse-train encoded) shutter-state control signals from the shutter-state control signal transmitter so as to drive both left and right eye viewing shutters into an optically transparent state;

FIG. 6C is schematic diagram of the stereoscopic 3-D viewing glasses of the present invention, showing being operated in its electrically-active mode (i.e. battery-power ON), where during a left image d period the stereoscopic viewing glasses receive infrared L-pulse-train encoded shutter-state control signals from the shutter-state control signal transmitter so as to drive the left-eye viewing shutter into an optically transparent state and the right-eye viewing shutter into an optically opaque state, and then during a right image display period the stereoscopic viewing glasses receive. infrared (R-pulse-train encoded) shutter-state control signals from the shutter-state control signal transmitter so as to drive the left-eye vie g shutter into an optically opaque state and the right-eye viewing shutter into an optically transparent state.

DETAILED DESCRIPTION OF THE ILLUSTRATIVE EMBODIMENTS

Figure 1:
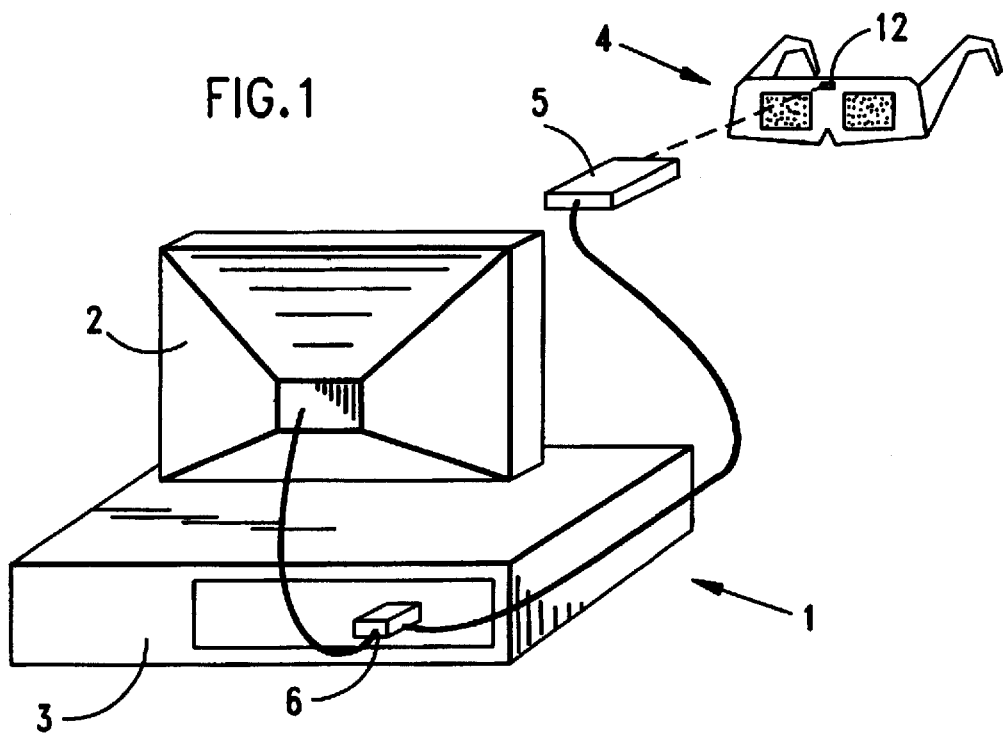
FIG. 1 is a perspective view of a generalized stereoscopic 3-D image viewing system of the present invention, suitable for desktop virtual reality (VR) and 3-D computer graphics applications, comprising a CRT-based display device, wireless stereoscopic 3-D viewing glasses having electro-optical viewing shutters, and a remote device for device for generating shutter-state control signals through real-time vertical and horizontal synchronization signal analysis, encoding these shutter-state control signals, and transmitting the same to the wireless stereoscopic 3-D viewing glasses for reception, decoding and control of the optical states of the viewing shutters.

As shown in FIG. 1, the stereoscopic 3-D image viewing system of the present invention 1 comprises a number system components, namely: a CRT-based display device 2; a video signal source 3 for producing video signals representative of either 2-D images, or stereoscopic image pairs for 3-D stereoscopic viewing using the time-multiplexed (i.e. field-sequential) display format; wireless stereoscopic 3-D eyewear (e.g. viewing glasses) 4 having left and right electro-optical viewing shutters for the left and right eyes of its user, respectively; and a remote transmitting device 5 for (i) generating shutter-state control signals (through real-time vertical and horizontal synchronization signal analysis), (ii) encoding these shutter-state control signals, and (iii) transmitting the same to one or more stereoscopic 3-D viewing glasses wirelessly lined to the transmitter, for reception, decoding and use in switching the optical states of the viewing shutters (e.g. from optically opaque to optically transmissive).

In general, the system has three principal modes of operation, namely: a Passive (Polarizing) Viewing Mode shown in FIG. 6A; an Active Head-to-Head 2-D Viewing Mode illustrated in FIG. 6B; and an Active Stereo 3-D Viewing Mode illustrated in FIG. 6C. While each of these modes of operation will be described in great detail hereinafter, suffice it to say for now that in each such mode of operation, each viewer wears a pair of the stereoscopic 3-D viewing glasses so that its left and right electro-optical viewing shutters thereof are positioned before his or her left and right eyes, respectively, while displayed images are viewed through such viewing shutters under the control of the shutter-state control transmitter of the present invention.

In accordance with the present invention, the CRT-based display device 2 can be, for example, a CRT-based television set adapted for receiving a composite video signal (hereinafter"composite video signal"), or a CRT computer monitor of the VGA or SVGA style adapted to receive RGB video signals and horizontal and vertical synchronization signals (hereinafter "computer video signal(s)") over separate electrical lines in a manner well known in the art. These CRT-based display devices will be referred to as a "CRT video display" or a "CRT computer display", respectively. The CRT video display always operates in interlaced mode, and therefore the interlaced method of multiplexing will be used with this display device. The CRT computer display, on the other hand, may be programmed to operate using either the interlaced method or the Page Flipped method of multiplexing. In both types of CRT display devices, the image streams are distinguished using the horizontal and vertical sync pulse timings. For interlaced modes for both CRT display devices, the CRT display device itself varies the synchronization pulse timings to indicate the field identity. For page-flipped modes on the CRT computer display, the display driver hardware is programmed to vary the sync pulse timings as the pages are flipped. It should also be noted that the method of varying the sync pulse timings could be used to communicate other forms of information to the transmitter. For example, certain patterns could be used to turn the glasses on or off, or for other purposes.

Figure 2A:
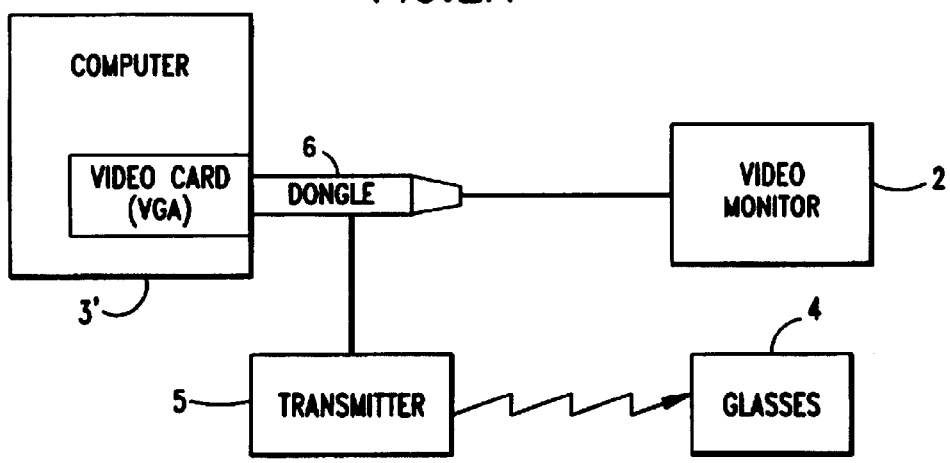
FIG. 2A is a block schematic system diagram of the first illustrative embodiment of the stereoscopic 3-D image viewing system of the present invention, shown in FIG. 1, wherein the shutter-state control signal transmitter and CRT VGA/SVGA video monitor are connected to the output port of a VGA/SVGA video card aboard a computer graphics system by way of a split connector (I.e. Dongle), with the wireless stereoscopic 3-D glasses being operably connected, in a wireless manner, to the shutter-state control signal transmitter by way of an IR signaling link.
Figure 2B:
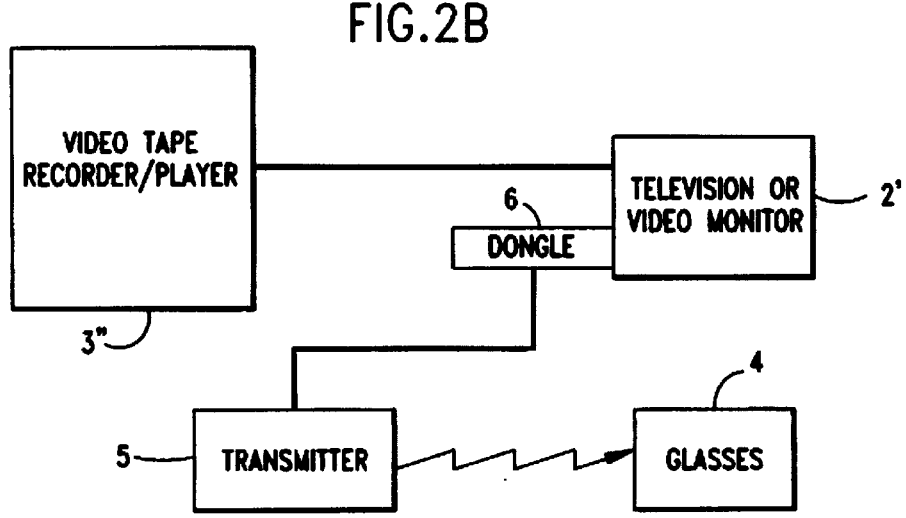
FIG. 2B is a block schematic system diagram of a second illustrative embodiment of the stereoscopic 3-D image viewing system of the present invention, wherein the video input of the shutter-state control signal transmitter is connected to the composite video output of a (NTSC or PAL styled) CRT-based television set or video monitor by way of a split connector (i.e. dongle), and the output port of a video tape player/recorder being connected to the input port of the CRT-based television set or video monitor, with the wireless stereoscopic 3-D glasses being operably connected to the shutter-state control signal transmitter in a wireless manner by way of an IR signaling link.
Figure 2C:
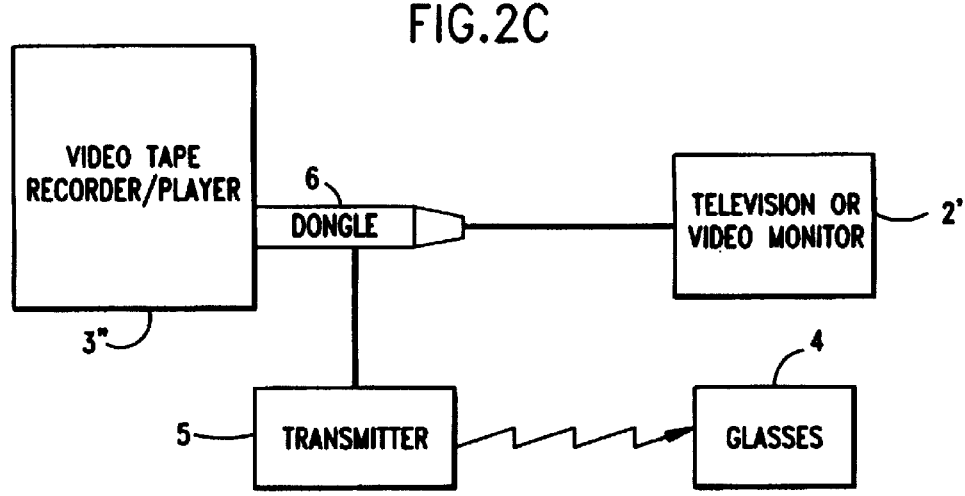
FIG. 2C is a block schematic system diagram of a second illustrative embodiment of the stereoscopic 3-D image viewing system of the present invention, wherein the video input of the shutter-state control signal transmitter and the output port of a video tape player/recorder are connected to the composite input of a (NTSC or PAL styled) CRT-based television set or video monitor by way of a split connector (i.e. dongle), with the wireless stereoscopic 3-D glasses being operably connected to the shutter-state control transmitter in a wireles manner by way of an IR signaling link

Similarly, the video signal source 3 can be, for example, either a VCR/player, CD-ROM laser disc player as, a computer graphics system with a VGA/SVGA video board, a stereoscopic video camera, or other image signal generation device as shown the various configurations set-up diagrams of FIGS. 2A through 2C. As shown in this diagrams, a simple video signal connector (i.e. "dongle") can be used to easily interface the shutter-state control signal transmitter with CRT computer and video devices and composite and computer video signal producing devices, according to different system configurations.

When using a video signal source that produces a"composite video signal", then a CRT-based display device adapted for receiving composite video signals must be used with the stereoscopic 3-D image viewing system. Likewise, when using a video signal source that produces a"computer video signal", then a CRT-based display device adapted for receiving computer video signals must be used with the stereoscopic 3-D image viewing system. Notably, however, the shutter-state control signal transmitter of the present invention is uniquely adapted for receive composite video signals provided over a RCA-type jack, as well as computer video signal provided over standard VGA or SVGA multi-wire cables, and thus is a"universal" shutter-state control signal transmitter, unknown in the prior art.

Figure 1A:
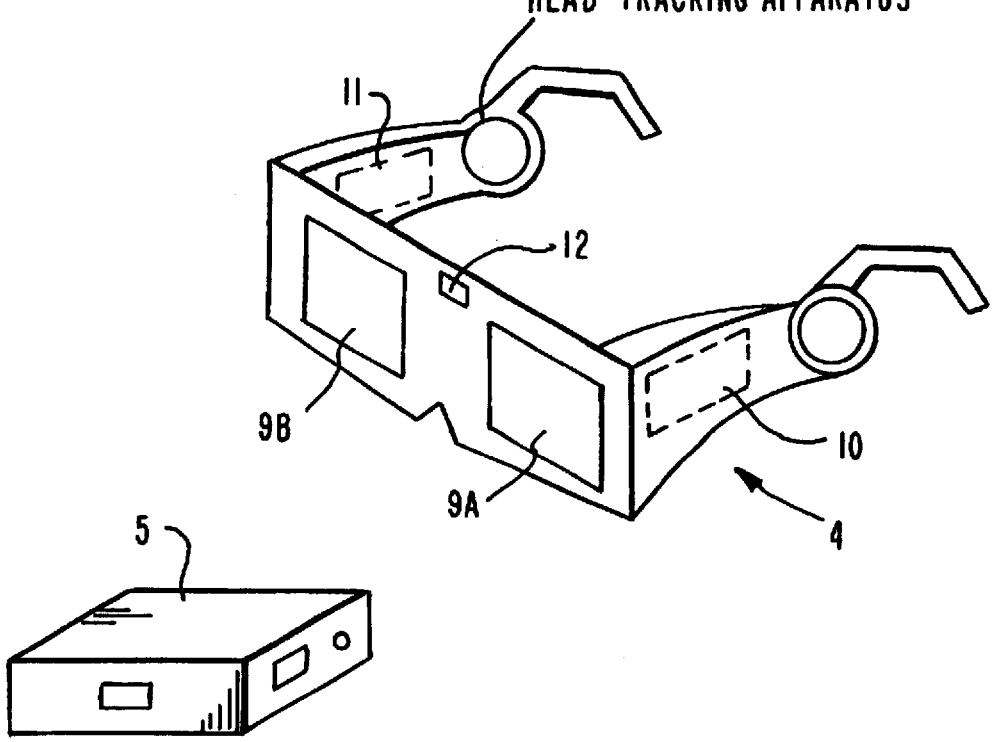
FIG. 1A is a perspective view of the stereoscopic 3-D eyewear and shutter-state control signal transmitter of the illustrative embodiment.

As shown in FIG. 1A, stereoscopic 3-D eyewear of the present invention comprises: a lightweight plastic frame 8 having a frontal frame portion 8A with viewing apertures within which left and right eye electro-optical viewing shutter panels 9A and 9B mounted; and ear-engaging portions hinged to the frontal frame portion and embodying miniature electronic circuit board(s) 10 and battery 11 in an ultra-compact manner. An infrared (IR) light sensing diode 12 is mounted within the center of the frontal frame portion, for receiving IR encoded signals carrying pulse train information transmitted from the transmitter. As will be described in greater detail hereinafter, the IR signals are received, decoded and used to generate shutter drive signals $D_L$ and $D_R$ for the left and right eye viewing shutters, which controllably switch the optical state of the viewing shutters 9A and 9B, in synchronism with the stereoscopic image pairs being sequentially displayed on the CRT display device, to realize the field-sequential stereoscopic display technique.

Figure 1B:
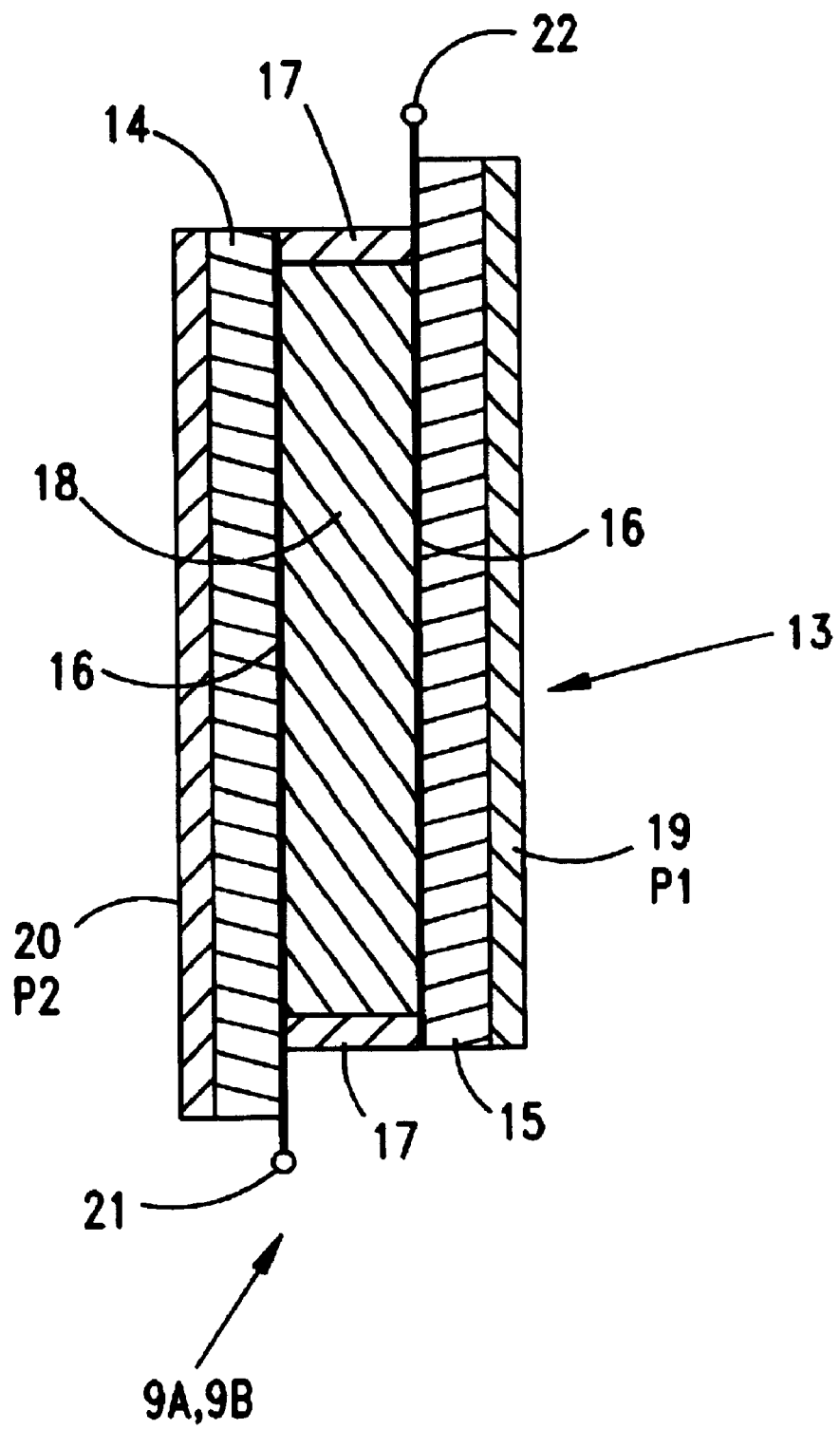
FIG. 1B is cross-sectional schematic representation of the twisted nematic (TN) liquid crystal (LC) viewing shutter panel installed in the left and right viewing aperture of the head-supportable frame of the stereoscopic 3-D eyeglasses of the illustrative embodiment.

As shown in greater detail in FIG. 1B, each electro-optical viewing shutter 9A, 9B in the stereoscopic eyewear of the present invention comprises a cell structure 13 consisting of first and second glass plates 14 and 15 approximately 1' square. Each glass plate is coated with optically transparent electrode forming material 16 (e.g. ITO) and then coated with polyamide alignment layer. The polyamide alignment layers on the first and second glass plates are rubbed or puffed, in directions that are 90° with respect to each other, in a manner well known in the art. These rubbing directions will cause the polyamide molecules to orient themselves and subsequently orient the liquid crystal molecule that they come in contact with. The complete cell is assembled by putting a spacer 17 of a certain thickness between the glass plates, which fixes this thickness to a desired value. Thereafter, the cell is filled with nematic liquid crystal material 18. The cell is then sealed using a suitable adhesive. Linear polarizer sheets 18 and 19 are then laminated to the outer surfaces of the sealed cell. These two polarizers have orthogonal polarization states P1 and P2. Prior to sealing of the cell, two contacts 20 and 21 are attached to the transparent electrodes on the first and second glass plates. These electrodes allow a state control voltage to be applied across the cell for switching purposes.

By virtue of the orthogonal rubbing directions of the polyamide layer, the liquid crystal material with the cell will experience a twist of the molecular directions such that top surface will align in one direction and the bottom surface will align in a direction that is perpendicular. This serves to rotate the polarization direction of light that enters from on one side of the cell to another direction that is 90° from the first one exiting the cell. In the absence of the voltage (i.e. in a passive state), the cell will therefore be redendered optically transparent. As soon as a voltage is applied across the cell, the liquid crystal molecules therein will be directly aligned along the direction of the applied electric field that is perpendicular to the cell, and thus the polarization direction of an electric field component of light entering the first surface of the cell will not undergo any rotation. Consequently, in this actively driven state, the electric field intensity of light entering the first surface of the cell is automatically extinguished by the second polarizer, thereby rendered the cell in its optically opaque (i.e. dark state).

Notably, switching speed of the cell can be enhanced and lower excitation voltages used if the cell thickness is kept to a minimum (e.g. the range of 5 microns). By achieving this design constraint, it is possible to avoid the need for high voltage DC-DC converters (as required as with current technologies) and obtain long operational life.

As schematically illustrated in the "video signal source/CRT display blocks" of FIG. 3, namely 3 and 3', the stereoscopic viewing system of the present invention supports two different techniques for displaying time-multiplexed,(i.e. field-sequential) image streams namely: the interlacing method, and the page flipping method.

The interlacing method uses the interlaced (i.e. interleaved mode of the display device, wherein the odd lines of an image buffer are displayed in one vertical sweep of the cathode ray, while the even lines of the image buffer are displayed during the next vertical sweep. In the interleaved mode, the two image streams are interleaved by placing one image stream on the odd lines of the buffer, and one image stream on the even lines, which produces a single interleaved image stream. The interleaved image stream is then converted to a time multiplexed pair of image streams by the interlacing hardware of the display device.

In the page-flipped mode, the page flipping method of time-multiplexing image streams involves alternately displaying images from the two image streams, either by copying them one after another into a single image buffer, or by copying them into two separate image buffers and then rapidly switching the display device between the two buffers.

In FIG. 3, the shutter-state control signal generator and transmitter") 4 is described in greater detail. As shown, the transmitter comprises: a compact housing 25 suitable for placement upon or attachment to a CRT display device or video signal producing device; a VGA/SVGA video signal input jack 26 mounted through the housing; a composite video signal input jack 27 mounted through the housing; a printed circuit (PC) board 28 upon which an integrated RISC processor 29 (e.g. 8 bit RISC Microcontroller No. PI16C64 from Microchip, Inc.,) with associated RAM, ROM and the like, programmed receive and process the horizontal and vertical synchronization signals provided to the computer video signal input port 26; an integrated video, signal processing device 30 (e.g. LM1881 IC ) for receiving and processing the composite video signal provided to the composite video signal input port 27; power distribution circuitry 31 for distributing DC power provided by an external 12 Volt AC-DC transformer 32; a system bus (not shown); IR LEDs 33 driven by a transistor-based driver circuit 34 under the control of the RISC processor; and visible LEDs 35 driven directly the RISC processor 29, for indicating power ON/OFF and pseudo video input.

As illustrated in FIG. 3,video signal processing device 30 perform three primary functions in the present application. At Block 30A, it clamps the AC component of the composite video input signal to a DC level. At Block 30B, it strips the horizontal and vertical synchronization signals of the composite video signal waveform and passes them onto Block 30C. At Block 30C, the horizontal and vertical synchronization signals are separated is and provided to different input ports of the RISC processor. The horizontal and vertical synchronization signals from the computer video signal input port are also provided to a different set of input ports of the RISC processor. The function of the RISC processor 29 is to sample the horizontal and vertical synchronization signals at its high-speed inputs, and in the event that horizontal and vertical synchronization signals are simultaneously provided to the RISC processor from both the composite and computer video signal input ports, then the computer video signal input port is accorded priority, for conflict avoidance.

The primary function performed by the RISC processor within transmitter unit 4 is analyze the pulse structure of horizontal and vertical synchronization signals at its input ports and generate, as output, digitally encoded shutter-state control signals (i.e. pulse trains) which are then used to transmit IR versions thereof towards the stereoscopic 3-D viewing glasses of the present invention. In general, this process involves: analyzing (i.e. counting) the number of horizontal synchronization pulses occur within each vertical synchronization pulse period (VSPP); produce and buffer therefor a horizontal synchronization pulse count (HSPC); and then if the HSPC indicates that a left image will be displayed next display period, then assign a first digitally encoded pulse sequence (I.e. L-pulse train) to this HSPC, and if the HSPC indicates that a right image will be displayed next display period, then assign a second (different) digitally encoded pulse sequence (i.e. R-pulse train) to this HSPC (e.g. where the length of the R-pulse train is 2 times the length of the L-pulse train, as illustrated in FIG. 4). This process is detailed in FIG. 6A. This process is repeated in a cyclical manner provided that there is video signal input to the shutter-state control signal transmitter.

Figure 3A:
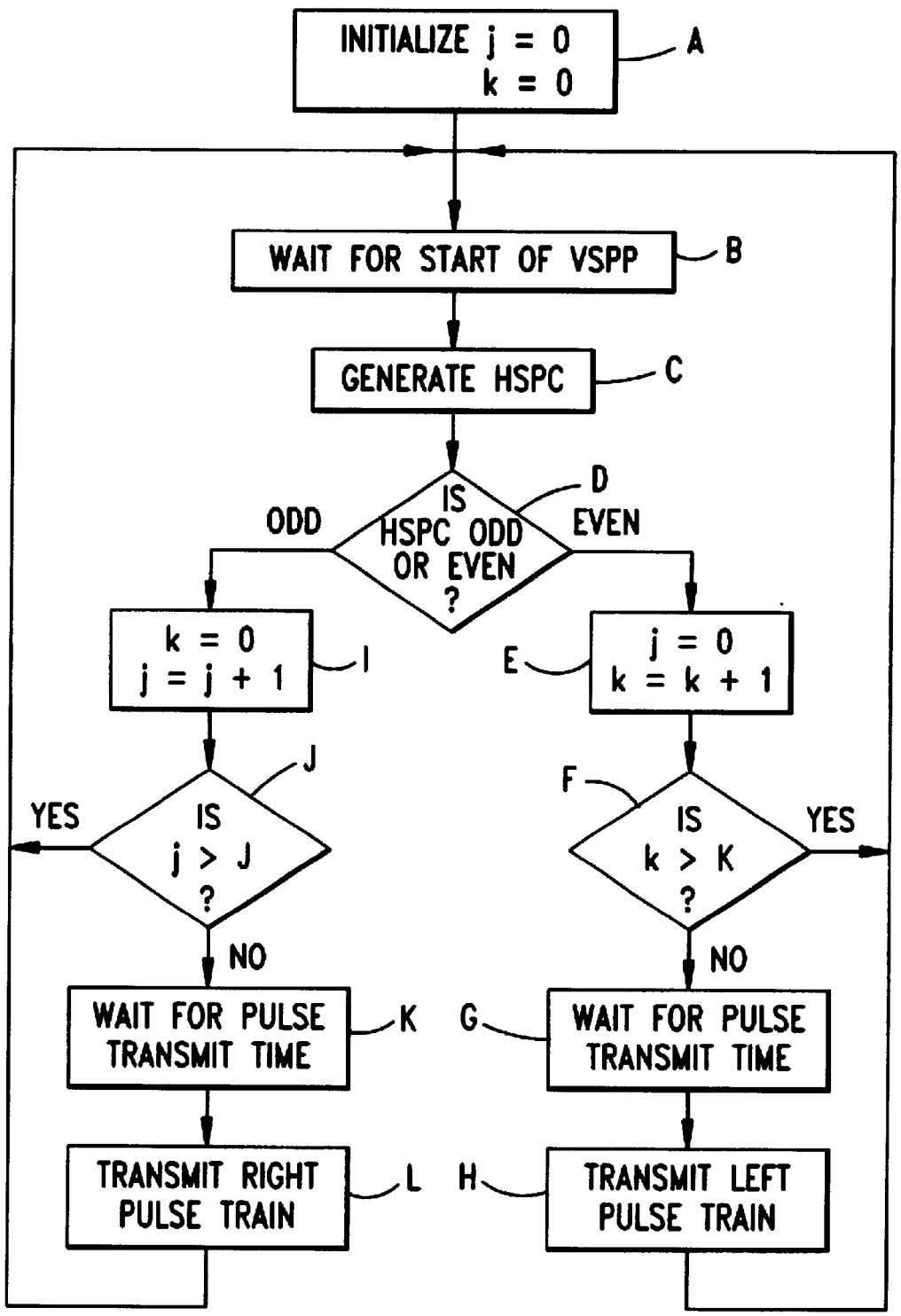
FIG. 3A is wihigh level flow chart illustrating the steps performed out by the Shutter-State Control Signal Generation Process of the present invention, carried out aboard the shutter-state control signal transmitter of the illustrative embodiment of the present. invention.

As indicated at Block A in FIG. 3A, the RISC processor intializes the "odd count" HSPC index j and the "even count" HSPC index k. Then at Block B, the RISC processor waits for the start of a vertical synchronization pulse period (VSPP). At Block C, the RISC processor generates a current horizontal synchronization pulse count (HSPC) for the current VSPP and buffers the same in memory. At Block D, the RISC processor determines whether the current is"odd" or"even". If the current HSPC is"even", then at Block E the RISC processor resets (i.e. clears) the "odd count" HSPC index (i.e. sets j=0), and increments the "even count" HSPC index k by+1 (i.e. sets k=k+1). Then at Block F the RISC processor determines whether the "even count" HSPC index k is greater than the preset "Even-Count HSPC Threshold" K. If it is then the RISC processor returns to Block B and resumes the process, as shown in FIG. 3. If the "even count" HSPC index k is not greater than the preset"Even-Count HSPC Threshold" K, then the RISC processor proceeds to Block G and waits for the Pulse Transmit Time, necessary to achieve the Left Image Display Anticipation, to be described in greater detail hereinafter. Then at the correct Pulse Transmit Time, the RISC processor performs the digital pulse train encoding and IR driver enabling to transmit an IR L-type digital pulse train from the IR diodes 33, and thereafter returns to Block B, as shown.

If, however, the RISC process determines at Block D that the current HSPC is "odd", then at Block I the RISC processor resets (i.e. clears) the "even count" HSPC index (i.e. sets k=0), and increments the "odd count" HSPC index j by +1 (i.e. sets j=j+1). Then at Block J the RISC processor determines whether the "odd count" HSPC index j is greater than the preset "Even-Count HSPC Threshold" J. If it is, then the RISC processor returns to Block B and resumes the process, as shown in FIG. 3. If the "odd count" HSPC index j is not greater than the preset "Even-Count HSPC Threshold" J, then the RISC processor proceeds to Block K and waits for the Pulse Transmit Time, necessary to achieve the Right Image Display anticipation process of the present invention, to be described in greater detail hereinafter. Then at the correct Pulse Transmit Time, the RISC processor performs the digital pulse train encoding and. IR driver enabling to transmit an IR R-type digital pulse train from the IR diodes 33, and thereafter returns to Block B, as shown.

The above process supports all three mode of system operation illustrated in FIG. 6A, 6B and 6C. When the process follows the loop through Blocks B-C-D-E-F-G-H-B, and/or Blocks B:C-D-I-J-K-L-B, the Active Stereo 3-D Mode is enabled, shown in FIG. 6C. When the process follows the loop through Blocks B-C-D-E-F-B, and/or Blocks B-C-D-I-J-B, the Passive 2-D Mode is enabled, shown in FIG. 6A. When no horizontal or vertical synchronization signals are provided to the RISC processor, the process of FIG. 3A is not carried out and the system is in its Passive (Polarizing) Viewing Mode, illustrated in FIG. 6A. In this system mode, there are no IR digitally encoded shutter-state control signals sent from the transmitter to the stereoscopic 3-D viewing glasses hereof and thus the viewing glasses enter its Power-Conservation Mode. As will be described in greater detail below, when the viewing glasses enters its Passive Mode, its RISC processor (embodied within the frame) goes into its ultra-low power consuming "Sleep Mode". The stereoscopic eyewear remains in its Passive Mode until either an IR L-pulse train or an IR R-pulse train is received at the stereoscopic viewing glasses, at which time the stereoscopic viewing glasses reenters its Active Mode.

As illustrated in the system diagram of FIG. 4, the stereoscopic viewing glasses embody miniature PC board, on which is mounted: an ultra-low power consuming, IC pulse amplifier 40 for applying electrical pulses produced by IR photodiode 12 mounted on frontal frame portion; a RISC processor (e.g. 8 bit RISC Microcontroller No. P16C64 from Microchip, Inc.,) with associated RAM, ROM and the like, programmed to receive and process the digitally-encoded pulse trains transmitted by the shutter-state control signal transmitter; 6.0 Volt battery 10; transistor-based LCD driver circuitry 42 for producing shutter drive signals $D_L$ and $D_R$ to left and right TN LC shutters 9A, 9B; a DC-DC converter IC 43 for providing a stepped up voltage to the power input of transistor-based LCD driver circuitry 42; a FET-based power-control-switch 44 connected between battery 10 and the power input port of the DC-DC converter 43.; a power-off timer 45; and an oscillator 46, arranged as shown.

As shown in FIG. 4, a number of functions elements are realized within programmed RISC processor 41 within the stereoscopic eyewear of the present invention. In particular, a waveform shaping circuit 47 is provided for shaping up (i.e. squaring-up) the output signal from IC pulse amplifier 40. Also, a L-pulse-train/R-pulse train decoder 48 is provided within the programmed RISC processor 41, for analyzing each digital pulse trains from the waveform shaping circuit 47 and determining whether it is represents a left shutter-state control signal (i.e. L=1) or a right shutter control signal (i.e. R=1). These decoded shutter-state control signals are provided as signal input to the transistor-based LCD driver circuitry 42. The function of transistor-based LCD driver circuitry is to generate a left shutter drive voltage $D_L$ when a left shutter-state control signal (i.e. L=1) is received as input, generates a right shutter drive voltage $D_R$ when a right shutter-state control signal (i.e. R=1) is received as input, and generate no shutter drive voltage when a neither a left or right shutter-state control signal is received as input to transistor-based LCD driver circuitry.

During operation, the system of the present invention may receive any one of four differently formatted video signals, automatically analyze the horizontal and vertical synchronization signals thereof, and produce appropriate shutter controls signals for automatically operating the stereoscopic shutter glasses of the present invention in accordance therewith, without operator intervention. As such, the system of the present invention embodies a substantial level of programmed intelligence, while retaining a great degree of simplicity and ease of use. These four situations are schematically depicted in FIGS. 5A, 5B, 5C and 5D.

Figure 5A:
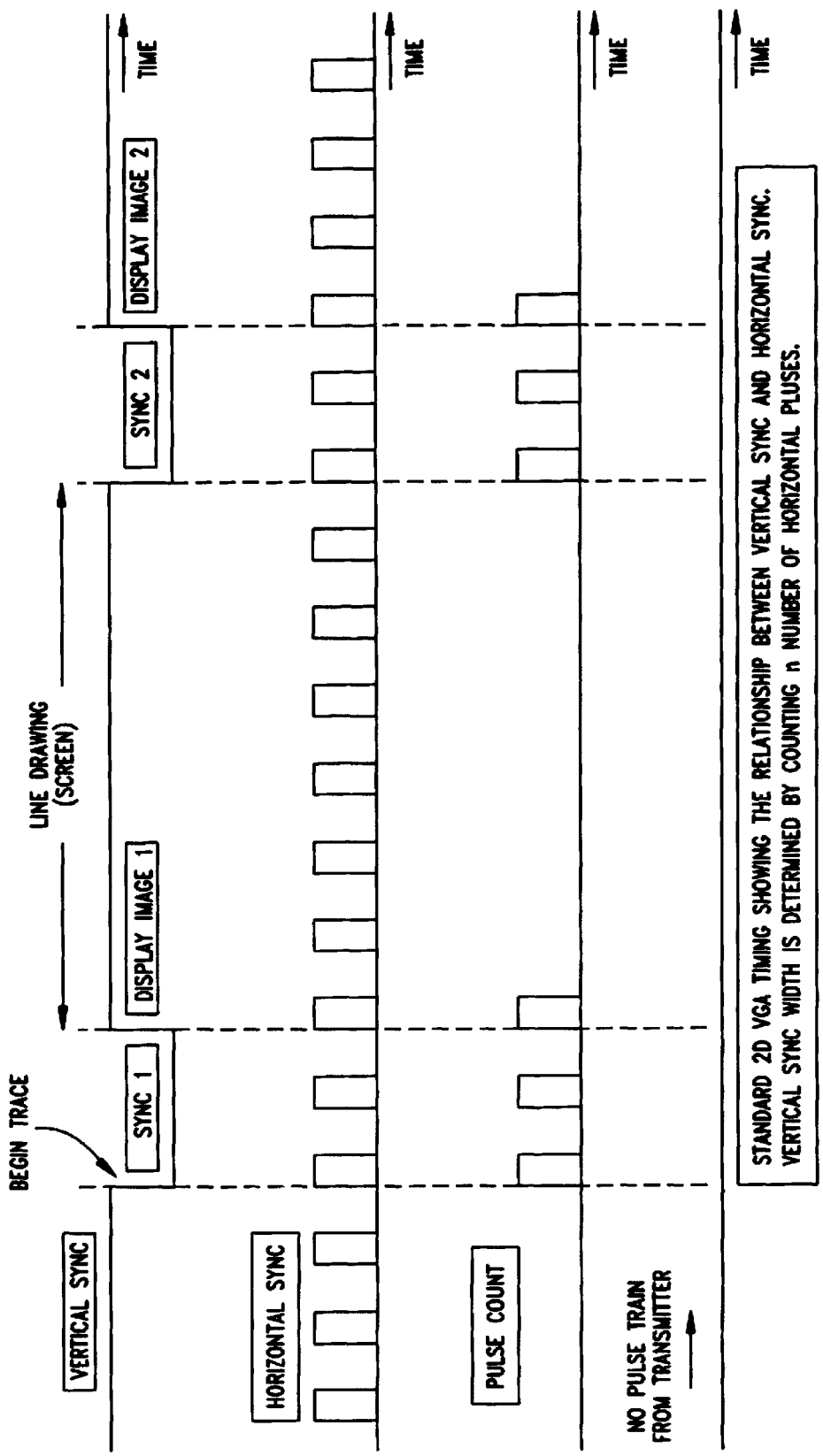
FIG. 5A is a schematic representation of (i) the vertical synchronization pulse signal associated with a standard 2-D VGA/SVGA formatted video signal produced from a standard VGA/SVGA video board in a computer system or workstation, (ii) the horizontal synchronization pulse signal associated with the standard 2-D VGA/SVGA formatted video signal produced therefrom, (iii) the horizontal synchronization signal pulse count (HSPC) generated by the shutter-state control signal transmitter hereof over each vertical synchronization signal pulse period (VSPP), and the absence of a L-pulse train or R-pulse train being generated in response thereto.

In FIG. 5A, the timing relationship is graphically illustrated between the horizontal and vertical synchronization. signals of a standard 2D VGA computer video signal. As shown, an consistent with the logic of the process of FIG. 3A, the HSPC is the same for each VSPP (I.e. no difference is found between two adjacent pulses for more than a preset number of fields). Thus, the process of FIG. 6 within the transmitter assumes that a non-multiplexed image stream is present, and transmits control signals which place both shutters in the transmissive state indicating a non-stereoscopic video image is to be viewed.

Figure 5B:
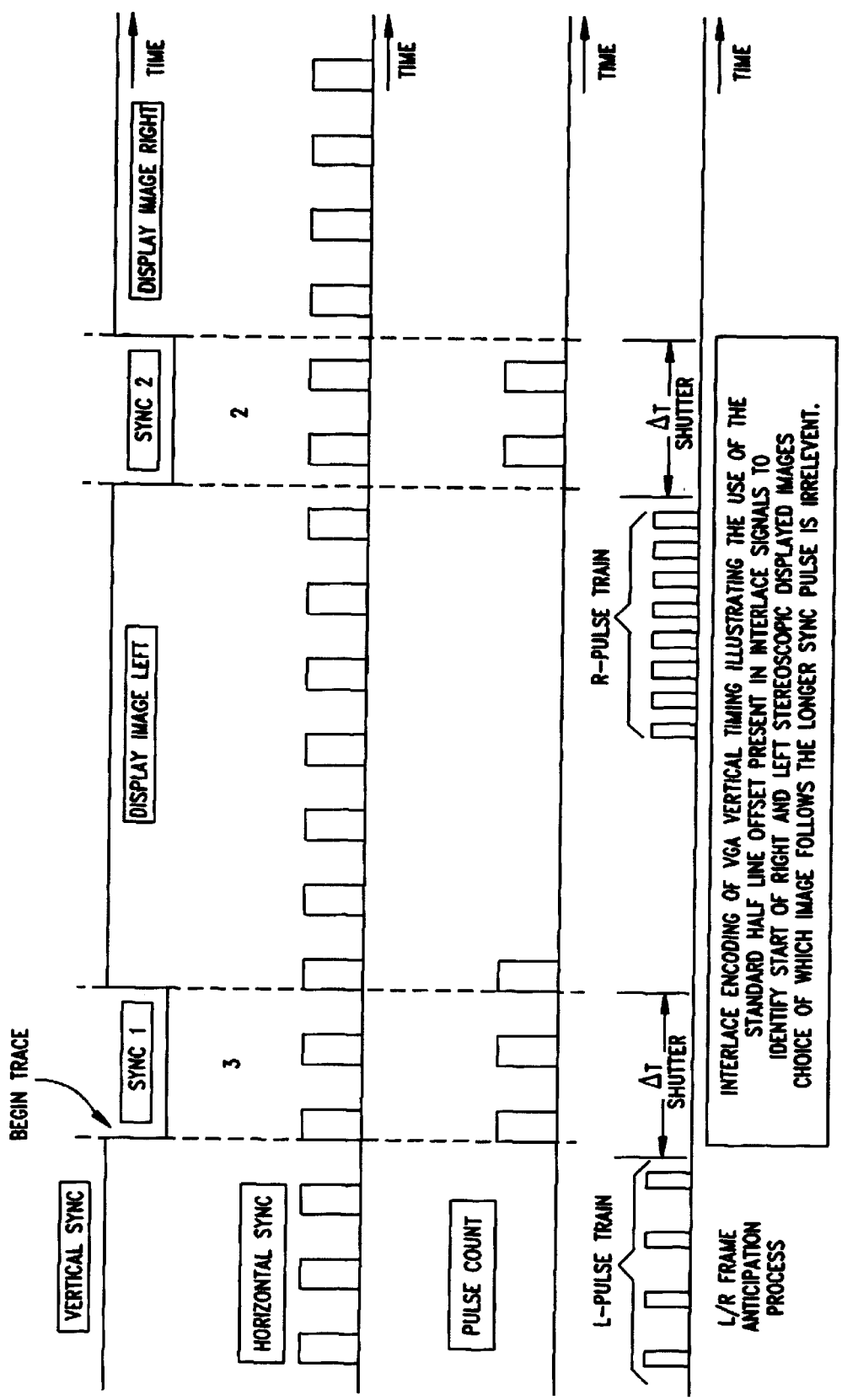
FIG. 5B is a schematic representation of (i) the vertical synchronization pulse signal associated with a standard 3-D VGA/SVGA interlaced (i.e. interleaved) formatted video signal produced from a standard V A/SVGA video board in a computer system or workstation, (ii) the horizontal synchronization pulse signal associated with the standard 3-D VGA/SVGA interlaced format video signal produced therefrom, (iii) the horizontal synchronization signal pulse count (HSPC) generated by the shutter-state control signal transmitter hereof over each vertical synchronization signal pulse period (VSPP), and (iv) the L-pulse train generated after detecting a right perspective image to be displayed, in anticipation of the next left perspective image to be displayed on the CRT display, and the R-pulse train generated after detecting a left perspective image to be displayed, in anticipation of the next right perspective image to be displayed on the CRT display.

In FIG. 5B, the timing relationship is graphically illustrated between the horizontal and vertical synchronization signals of an interlaced-encoded 3-D VGA computer video signal. As shown, an consistent with the logic of the process of FIG. 3A, the HSPC is the "odd" for a left image to be displayed and "even" for a right image to be displayed. During system operation, the function of the transmitter is to decode and interpret the identity of the field from the sync pulse timings. However, there is very little time between the end of vertical sync to the beginning of the next displayed field. Because the LCD shutters may be slow to respond, this could potentially result in the shutters being in the wrong state at the beginning of the next field. To correct this problem, a novel anticipation and correction scheme is used.

Figure 5C:
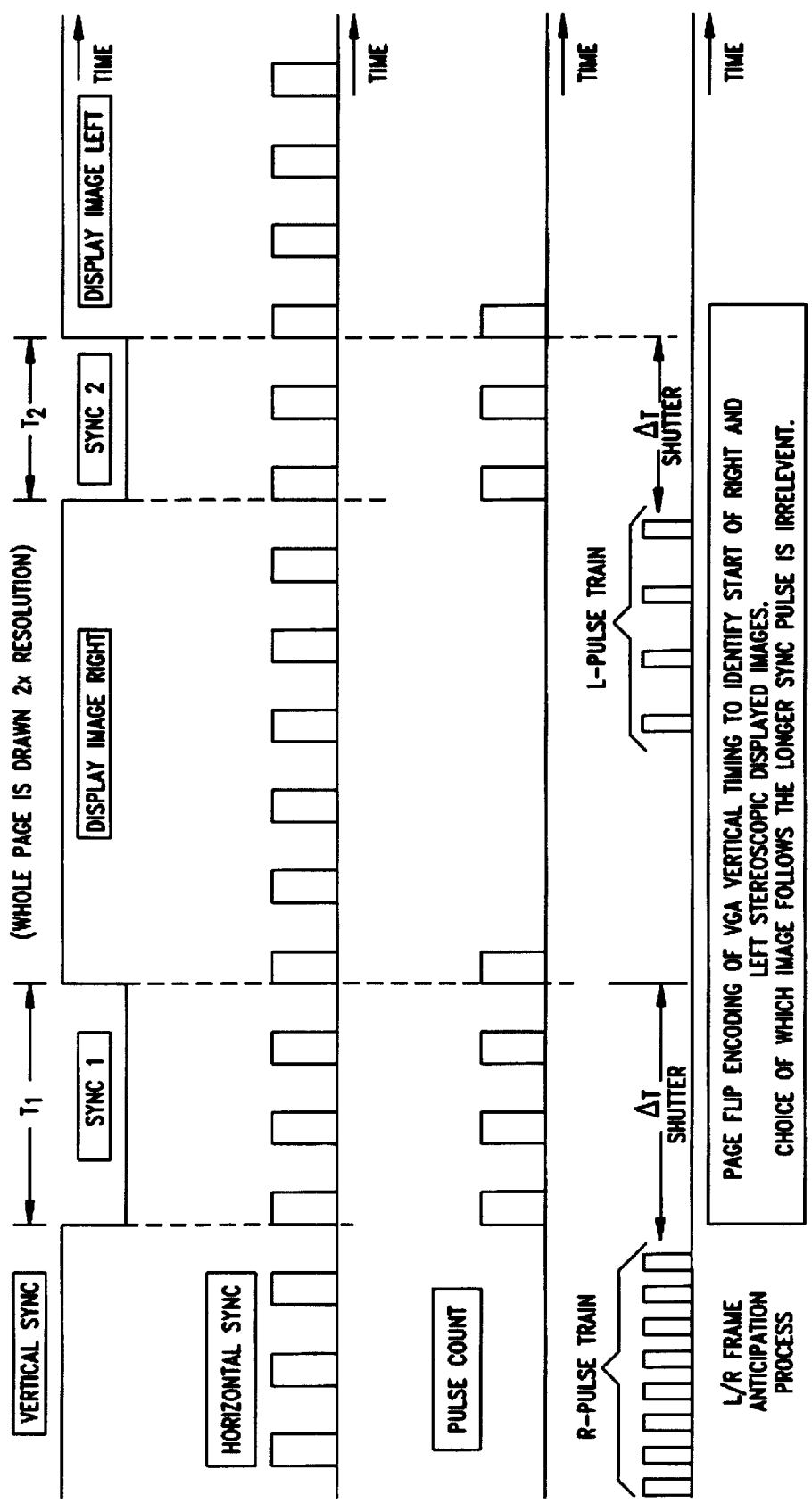
FIG. 5C is a schematic representation of (i) the vertical synchronization pulse signal associated with a Page-Flipped formatted video signal produced from a standard VGA/SVGA video board programmed in accordance with the image formatting method of the present invention, (ii) the horizontal synchronization pulse signal associated with the standard Page-Flipped formatted video signal produced therefrom, (iii) the horizontal synchronization signal pulse count (HSPC) generated by the shutter-state control signal transmitter hereof over each vertical synchronization signal pulse period (VSPP), and (iv) the L-pulse train generated after detecting a right perspective image to be displayed, in anticipation of the next left perspective image to be displayed on the CRT display, and the R-pulse train generated after detecting a left perspective image to be displayed, in anticipation of the next right perspective image to be displayed on the CRT display.
Figure 5D:
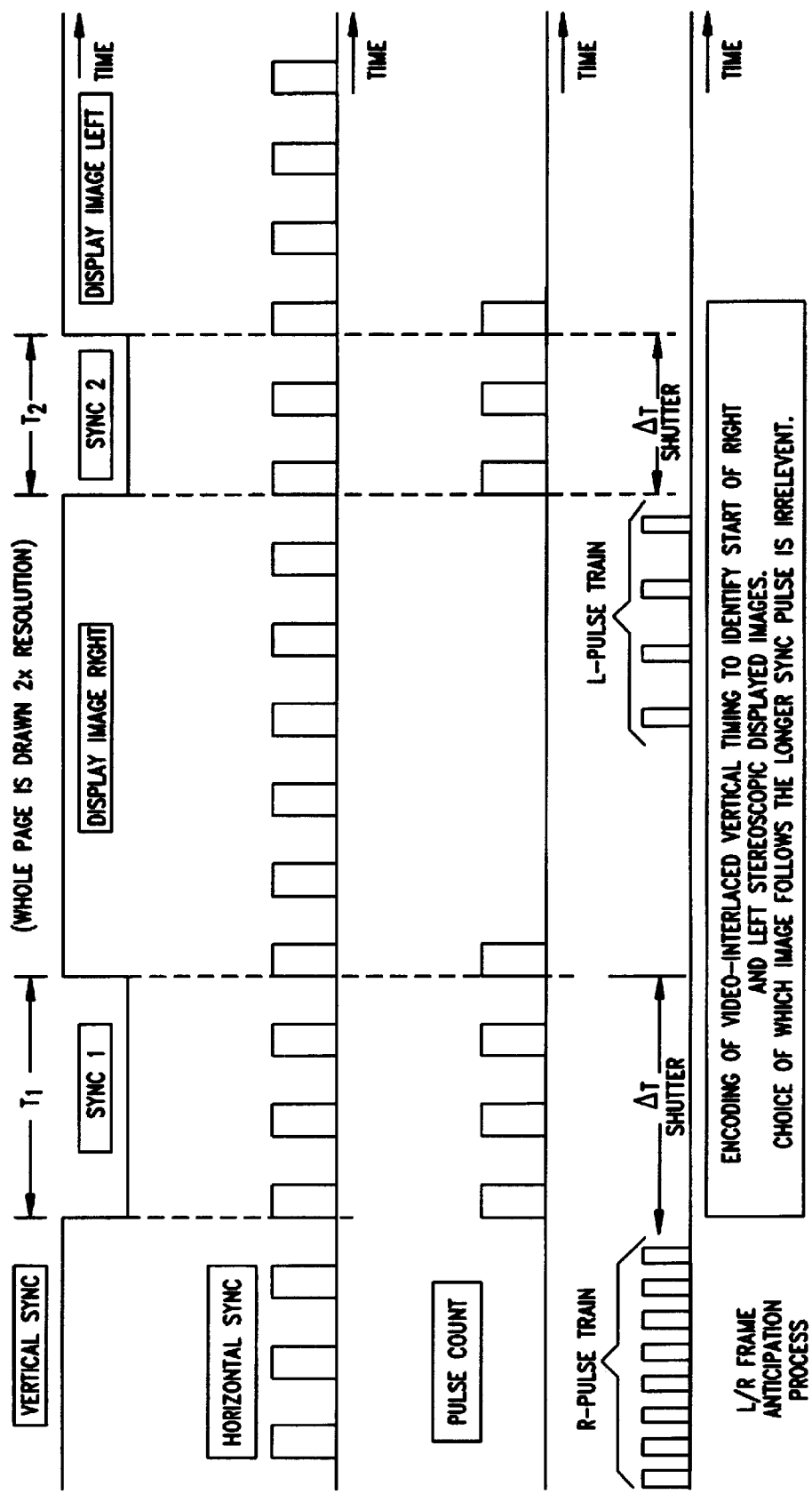
FIG. 5D is a schematic representation of (i) the vertical synchronization pulse signal associated with a video-interlaced (i.e. interleaved) formatted video signal produced from a (NTSC or PAL) composite video signal source in accordance with the image formatting method of the present invention, (ii) the horizontal synchronization pulse signal associated with the video-interlaced formatted video signal produced therefrom, (iii) the horizontal synchronization signal pulse count (HSPC) generated by the shutter-state control signal transmitter hereof over each vertical synchronization signal pulse period (VSPP), and (iv) the L-pulse train generated after detecting a right perspective image to be displayed, in anticipation of the next left perspective image to be displayed on the CRT display, and the R-pulse train generated after detecting a left perspective image to be displayed, in anticipation of the next right perspective image/to be displayed on the CRT display.
Figure 7:
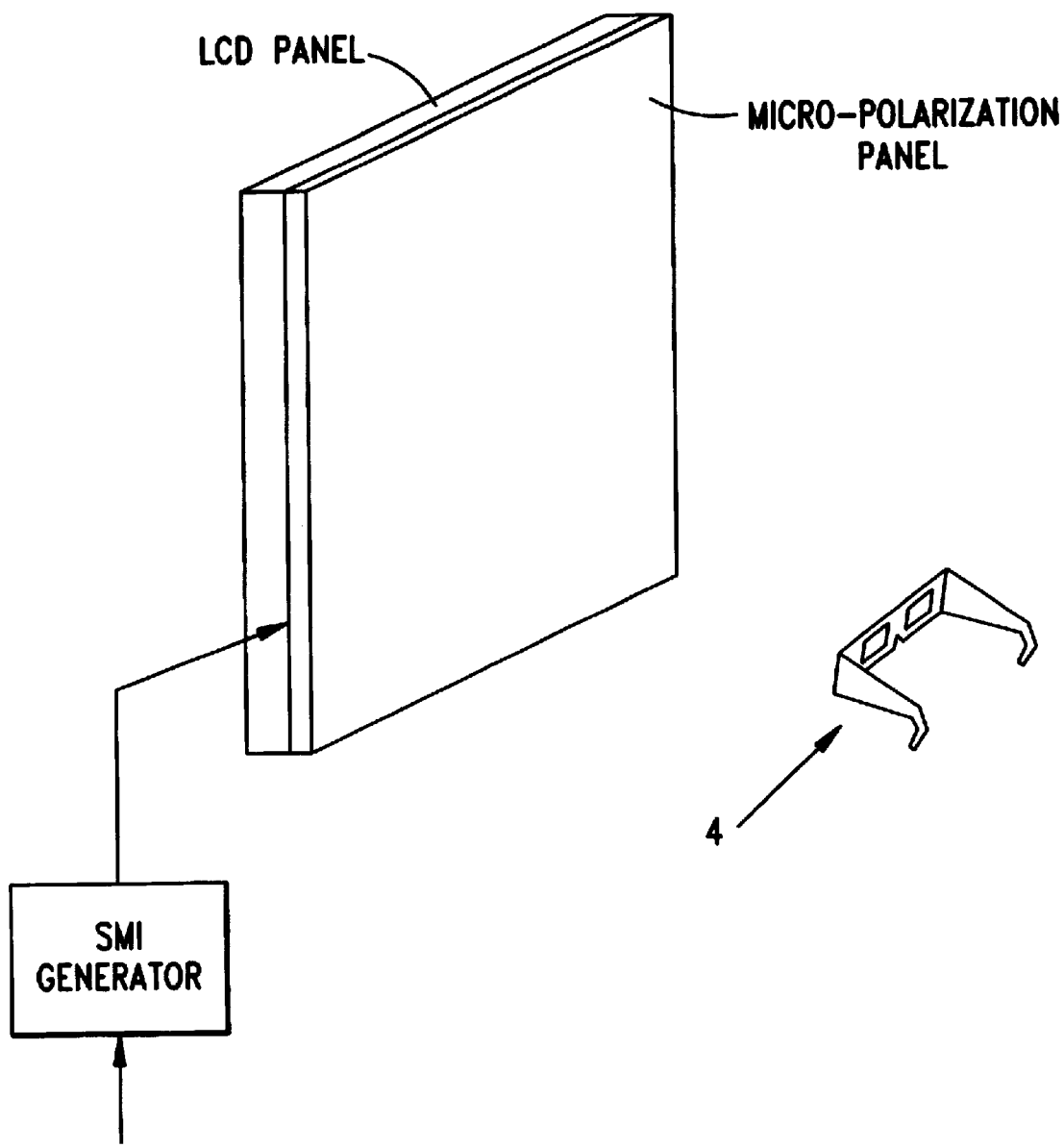
FIG. 7 is a schematic representation of another embodiment of the stereoscopic 3-D image viewing system of the present invention, based on the spatially-multiplexed image (SMI) display format, in which the stereoscopic 3-D shutter glasses of the present invention are operated in their electrically-passive (transmissive or clear) state, for stereoscopic viewing of 3-D images represented in linearly-micropolarized polarized SMIs displayed from an LCD panel.

As indicated in the pulse train timing diagrams of FIGS. 5B through 5D, this Left/Right Image Anticipation scheme relies on the assumption that the displayed image stream alternates almost every field. In this case, it is assumed that the next field will be the other image stream, and the signal is sent to the shutters to set them to this anticipated state, before the field identity is actually confirmed by observing the sync pulse timings. The signal is transmitted at the correct time (i.e. Pulse Transmit Time), taking into account the electrical and optical. properties of the TN-LC shutters, to ensure that the shutter is at the correct optical state when the image is displayed. If it is discovered that the displayed field did not alternate as expected, a second signal is sent to the shutters to correct the error, and force the shutters back into the correct state. For video displays and for interlaced computer displays the correction will not actually need to be done, since the display hardware enforces the alternating image streams. For page flipped methods, where the image stream multiplexing is performed in software, it is possible that the computer will not keep up with the vertical refresh rate of the monitor, in which case the correction scheme will minimize any adverse impact. By using the anticipation and correction scheme, it is possible to use slower electronics in the shutter system, reducing power consumption and extending battery life.

Notably, as the transmitter hereof transmits shutter-state control signals prior to the vertical blanking interval (as indicated in FIGS. 5B through 5D), the Left and Right image pulse (train) information may be of much larger widths. Consequently, thus the detection circuitry within the stereoscopic viewing glasses of the present invention can function at much slower clocking speeds and with battery life greatly increased. In order to accomplish the Left/Right Image Anticipation scheme at the transmitter, the transmitter processor must be capable of detecting the vertical refresh rate of the video transmission determining the field identification for the present field (odd or even) and transmitting the field information of the next video field just prior to the end of the current video field being displayed, as shown at Blocks G-H and K-L of FIG. 3A. To accommodate the difference in TN LCD turn-on and turn-off times, the L/R pulse train width can be shifted within the video field. By carefully controlling the construction of the optical shutter and the characteristics of the pulse transitions, it is possible to create a universal stereoscopic viewing system with exceptionally long battery life.

For current computer systems the Video Graphics Adaptor (VGA) controls the video signals sent to the monitor. These signals consist of the horizontal sync pulse, the vertical sync pulse and the red, blue and green (RGB) video signals. The RGB signals vary depending on the image data to be displayed. The vertical and horizontal sync pulse timings vary depending on the resolution of the image being displayed.

The horizontal and vertical pulses dictate the scan rate of the display. The horizontal sync pulse occurs once every horizontal line. The vertical sync pulse occurs once every screen refresh period. Internal to the VGA is a horizontal scan line counter that is incremented by one on every horizontal sync pulse. When its value is equal to value loaded into the Vertical Total Register in the VGA control logic memory the scan line counter is reset to zero. Vertical events are driven when the scan line counter equals one of the values set in the relevant vertical registers. The basic events are vertical sync, display enable and vertical blanking. Each of these is represented in several of the VGA registers. The Vertical Total Register dictates how many scan lines are present on the screen. The vertical sync pulse begins when the scan line counter equals the value in the Vertical Start Register and ends when the scan line counter equals the value in the Vertical End Register. The vertical sync pulse signals the monitor to begin the display of a new image on the screen, sending the electron beam back to the top left corner of the display.

Proper control of these register values and subsequent sync pulse timings provides a basis for controlling a pair of LCD shutter glasses synchronized to sequentially displayed stereoscopic images. The display timings can be encoded in such a manner that one sync pulse condition can signify the display of right eye information and a second sync pulse condition will signify the display of left eye information. Proper encoding of the sync signals can therefore convey information to the optical shutters to remain in an optically clear non-shuttering state when 2D images are displayed or switch states in response to 3D stereoscopic pairs alternatively displayed on the monitor.

When displaying 2D images, the image data is written into a frame memory. The scan-line counter will automatically increment on each horizontal sync pulse. When the scan line counter equals the value in the Vertical Start Register the vertical sync pulse output changes state. The scan line counter continues to increment on each horizontal sync pulse. When the counter reaches the value stored in the Vertical End Register the vertical output returns to its initial state signifying the end of the vertical sync period. Thus the vertical sync period may be any number of horizontal pulse wide and is completely under the control of the application program being executed.

If normal VGA timings are present, the same number of horizontal sync pulses will be present during every vertical sync period. The interval between vertical sync signals can be measured. A register in the field identification circuitry will be loaded with the frame rate information. The number of horizontal sync pulses during the vertical interval are counted by a pulse train counter and the outcome is compared with results obtained during the immediately preceding vertical sync period. By varying the number stored in the Vertical End Register the number of horizontal pulses occurring within a vertical sync period can be varied and thus contain discernable information to communicate frame identification. If subsequent vertical sync pulses contain the same number of horizontal pulses the 2D mode is identified and the shutters will be driven both open. If the number of horizontal pulses within the vertical sync period is made to increase or decrease by 1 in adjacent vertical periods, page flip 3D stereoscopic mode is identified and the shutters can be made to open or close in synchronization with displayed images.

Specifically, if the time between vertical sync pulses is monitored, information relating to frame rate can be measured. Since the TN shutters have a finite switching time this information is important in predicting and anticipating when the next frame of display information is to start. By counting the number of horizontal sync pulses present during a vertical sync period and comparing it to subsequent counts contained in adjacent vertical sync periods, information to identify frame information can be encoded and an appropriate sequence of action be taken to ensure proper synchronization of the optical shutters and the displayed information.

The page flip mode will enable stereo pairs to be displayed and viewed at the nominal frame rate of the display. By enabling interlace mode, since alternating odd and even fields of the display are written sequentially, if odd line field contained for example the left eye perspective image and the even line field contains the right eye perspective image, stereo pairs can be viewed with this system at twice the frame rate which will essentially eliminate perceived flicker in the image by the observer. Since a half horizontal line shift is intrinsic to the interlace mode in VGA systems, to identify interlace mode if the horizontal sync pulses contained within the vertical sync period will vary in number by 1. Since this is the same condition created to detect the varying number of encoded sync pulses indicating page flipped stereo pairs, the exact circuitry can be utilized to operate in interlace mode to offer stereo viewing with minimum flicker.

Since the system hereof is capable of displaying stereo pairs from an interlace video format, it is also possible to input composite video from any standard NTSC or PAL video source such as a video cassette recorder or stereo camera. Composite video has field identification encoded in the seriation pulses present during the vertical retrace period. An odd number of seriation pulses indicates an odd field and an even number of seriation pulses indicates an even field. The composite video decoder circuit decodes the odd and even field information encoded in the composite video signals and creates a vertical sync and horizontal sync signal that mimics those present in VGA generated images. In this manner the same circuitry can be utilized for displaying stereo pairs from a standard video source.

The system hereof can be used to view two independent image streams from a single CRT or similar display device, either for the purpose of producing a single stereoscopic view or for the purpose of providing two individuals or groups the ability to view two different views. Images from the two image streams are time multiplexed on the display device, and then demultiplexed by means of electrically controlled optical shutters which are synchronized to the displayed images. In this way, each shutter transmits images from only one image stream, while blocking the other image stream.

Since the polarization axis of the LCD shutters can be oriented in opposing directions the viewing glasses may also be used in a passive state to view spatially multiplexed stereoscopic images. Such features make it possible for a viewer in a multi-format stereoscopic environment to view multiple forms of stereoscopic images with the same glasses.

Since the shutters used are TN LCD and not pi-cell technology, no background excitation voltage is needed to keep the shutters in the transmissive state. In this case since the polarizes inherently required in the structure of the optical state varying shutters are oriented orthogonally, they now function as passive polarized viewing glasses for viewing linearly polarized spatial multiplexed images.

If the two shutters are both synchronized to the same image stream, the user will see only that image stream. This mode, illustrated in FIG. 6B, would make it possible for two users or sets of users to view separate images on the same display, for the purpose of playing a head-to-head video game, for example. If the two shutters are synchronized to two different image streams, the user will view one image stream with one eye, and the other image stream with the other eye, allowing the production of 3D stereoscopic images.

The present invention has been described in great detail with reference to the above illustrative embodiments. It is understood, however, modifications to the illustrative embodiments will readily occur to persons with ordinary skill in the art. All such modifications and variations are deemed to be within the scope and spirit of the present invention as defined by the accompanying Claims to Invention.

What is claimed is:

1. A stereoscopic 3-D image viewing system, comprising:
   a pair of stereoscopic 3-D shutter-type viewing glasses for support on the head of a human viewer, and viewing stereoscopic image pairs displayed on either a CRT-based computer device or a CRT-based television device using a prespecified time-multiplexing display technique; and
   a universal multi-sync signal detector including
      means for receiving signals from a first signal source, for driving said CRT-based computer monitor device,
      means for processing said signals from said first signal source so as to detect synchronization signals therein and generate control signals for controlling said pair of stereoscopic 3-D shutter-type viewing glasses so that a user wearing said pair of stereoscopic 3-D shutter-type viewing glasses can view stereoscopic image pairs displayed on said CRT-based computer monitor device according said prespecified time-multiplexing display technique, and
      means for receiving signals from a second signal source, for driving said CRT-based television device, and
      means for processing said from said second signal source so as to detect synchronization signals therein and generate control signals for controlling said pair of stereoscopic 3-D shutter-type viewing glasses so that said user wearing said pair of stereoscopic 3-D shutter-type viewing glasses can view stereoscopic image pairs displayed on said CRT-based television device according said prespecified time-multiplexing display technique.

2. The stereoscopic 3-D image viewing system of claim 1, said pair of stereoscopic 3-D shutter-type viewing glasses comprises a pair of LCD shutter panels mounted within a frame supportable on the head of said human viewer, and a battery power source mounted within said frame.

3. The stereoscopic 3-D image viewing system of claim 1, wherein said pair of 3-D shutter-type viewing glasses have a passive mode of operation for use in decoding micropolarized spatially-multiplexed images displayed from a spatially-multiplexed image display system.

4. The stereoscopic 3-D image viewing system of claim 2, which further comprises means for detecting stereoscopically-encoded video synchronization signals from a computer or other video source and transmitting field information for remotely controlling the optical state of said pair of LCD shutter panels via the transmission of pulse width modulated infrared pulses to said pair of stereoscopic 3-D shutter-type viewing glasses.

5. The stereoscopic 3-D image viewing system of claim 2, wherein as one said LCD shutter panel switches to the transmissive state the other said LCD shutter panel switches to the opaque state synchronized to a specific field of information displayed on the CRT-based computer device or the CRT-based television device.

6. The stereoscopic 3-D image viewing system of claim 1, which has a display mode that allows two human viewers, wearing two separate pairs of stereoscopic 3-D shutter-type viewing glasses to view two separate images simultaneously on the same display screen, thereby allowing the two human viewers to play a head-to-head video game on the same viewing screen without interference.

7. The stereoscopic 3-D image viewing system of claim 2, wherein the polarization axis of said LCD shutter panels can be passively oriented in opposing directions and be used as a pair of electrically-passive polarizing glasses to stereoscopically view spatially multiplexed images (SMI).

8. The stereoscopic 3-D image viewing system of claim 1, which has several different modes of operation which make it possible for a viewer, in a multi-format stereoscopic environment, to view a variety of stereoscopic images with the same viewing glasses.

* * * * *